United States Patent [19]

Grosso et al.

[11] Patent Number: 5,222,048
[45] Date of Patent: * Jun. 22, 1993

[54] METHOD FOR DETERMINING BOREHOLE FLUID INFLUX

[75] Inventors: Donald S. Grosso, West Hartford; Ali H. Abdallah, Rocky Hill, both of Conn.

[73] Assignee: Eastman Teleco Company, Houston, Tex.

[*] Notice: The portion of the term of this patent subsequent to Oct. 8, 2008 has been disclaimed.

[21] Appl. No.: 611,036

[22] Filed: Nov. 8, 1990

[51] Int. Cl.⁵ .............................. G01V 1/00
[52] U.S. Cl. .......................... 367/32; 367/25; 367/30; 181/102; 175/40; 175/48; 175/50; 166/336; 166/250; 73/155

[58] Field of Search .......... 367/25, 28, 30, 48, 367/81–86, 911, 912, 32; 340/850, 853; 166/336, 250; 175/40, 48, 50; 73/155; 181/102

[56] References Cited

U.S. PATENT DOCUMENTS 5,055,837 10/1991 Abdalla et al. .................. 340/853

FOREIGN PATENT DOCUMENTS 2049934 12/1980 United Kingdom ............ 367/81

Primary Examiner—J. Woodrow Eldred
Attorney, Agent, or Firm—Fishman, Dionne & Cantor

[57] ABSTRACT

Fluid influx in a borehole is determined by examining and monitoring the computed transfer function in the signal channel defined by the annulus between the borehole and a drillstring in the borehole.

14 Claims, 3 Drawing Sheets

METHOD FOR DETERMINING BOREHOLE FLUID INFLUX

BACKGROUND OF THE INVENTION

The present invention relates to exploration for sources of hydrocarbon fuel and particularly to enhancing the safety of oil and gas will drilling procedures. More specifically, this invention is directed to apparatus and methods for detection of the infusion of fluid into a borehole.

In the drilling of oil and gas wells, drilling safety and efficiency are extremely important. One safety problem relates to what is known as a "blowout". A zone of high geopressure, contained by cap rack, will occasionally be unknowingly encountered during drilling. If this pressure exceeds the hydrostatic pressure exerted by the drilling mud, and the formation has sufficient permeability to allow fluid flow, then the formation fluid will displace the drilling mud. This is referred to as a "kick"; and if unchecked will cause what is known as a "blowout" condition, the "blowout" condition generally having catastrophic results. This borehole condition which the driller desires to monitor, in order to ensure against "blowout", is fluid influx.

Various techniques have previously been proposed, and in some cases implemented for measuring fluid infusion into a borehole including sensing the borehole annulus pressure, sensing the pressure differential between the interior of the drill string and the annulus, measuring the velocity of sound in the drilling mud, measuring the resistivity of the drilling mud and various other tests based upon attempts to measure the pressure of the formation through which the drill string is penetrating or has penetrated. These previously proposed fluid detection techniques, and particularly those based upon pressure measurements, all have deficiencies which severely limit their usefulness.

An improved borehole fluid influx detection system is described in U.S. Pat. Nos. 4,733,232 and 4,733,233, both of which are assigned to the assignee hereof and fully incorporated herein by reference. In accordance with the methods of these prior patents, the pressure in the annulus between the standpipe (drill pipe or string) and wall of the well is monitored at the surface. Frequency or amplitude modulation of the mud flow in the standpipe by a coherent energy source at a point near the drill bit will result in the mud flow in the annulus containing information in the form of reflections of the modulation of the flow in the standpipe. Pressure monitoring of the mud flow in the annulus at the surface thus results in the detection of the reflected information resulting from modulation of the column of drilling mud in the drill string (standpipe). The pressure variations detected in the annulus are compared to pressure variations detected in the standpipe. A significant change in phase and/or amplitude ratio between the standpipe and annulus pressure variations, particularly a change in Phase and/or amplitude ratio which constitutes a significant deviation from a previously established history, will indicate that there is a fluid influx into the annulus since fluid, for example gas, flowing into the drilling mud will produce attenuation of the modulated information and/or will affect the transmission velocity.

While well suited for its intended purposes, there continues to be a need for additional and improved methods of detecting fluid influx in the borehole.

SUMMARY OF THE INVENTION

The above-discussed and other problems and deficiencies of the prior art are overcome or alleviated by the method of detecting fluid influx of the present invention. In accordance with the present invention, fluid influx in a borehole is detected by examining and monitoring the computed annulus transfer function. When a downhole energy source, such as MWD pressure pulses, travel to the surface through the drillstring channel and through the annulus channel, the source becomes distorted. The shape (e.g. waveform) of the original signal is known, either because a pre-determined message is sent, or because the transmitted message is reconstructed at the surface. This known transmitted signal is processed with the received signal (which includes the channel distortion) in order to determine the transfer function H(s), of the annulus channel. When a fluid possessing different physical properties as the drilling fluid, such as density, intrudes into the annulus space, the annulus transfer function $H_{(S)}$ will most likely be changed and this change can be used to predict the intrusion. Because the presence of gas in the annulus fluid will greatly change the transfer function H(s) of the annulus signal, this change can be particularly useful as an indicator of gas influx.

The above-discussed and other features and advantages of the present invention will be appreciated and understood by the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

In accordance with the present invention, when a signal is transmitted through a medium, the signal is distorted by the attenuation and phase delays of that medium. The phase and frequency response that characterizes the channel are referred to as the channel transfer function. If the shapes of the transmitted and received signal are known, then the transfer function of the channel can be computed. Because phase (speed of sound) and frequency response (selective energy absorption) are governed by physical properties of fluids, the transfer function is a measure of these properties. If these properties are changed by a fluid intrusion, the transfer function will change. As the transfer function of the annulus channel is very sensitive to the presence of gas, it can be particularly useful to detect the presence of gas in the annulus. This invention is thus a method of predicting fluid influx and especially gas influx by examination of the computed annulus transfer function.

Figure 1:
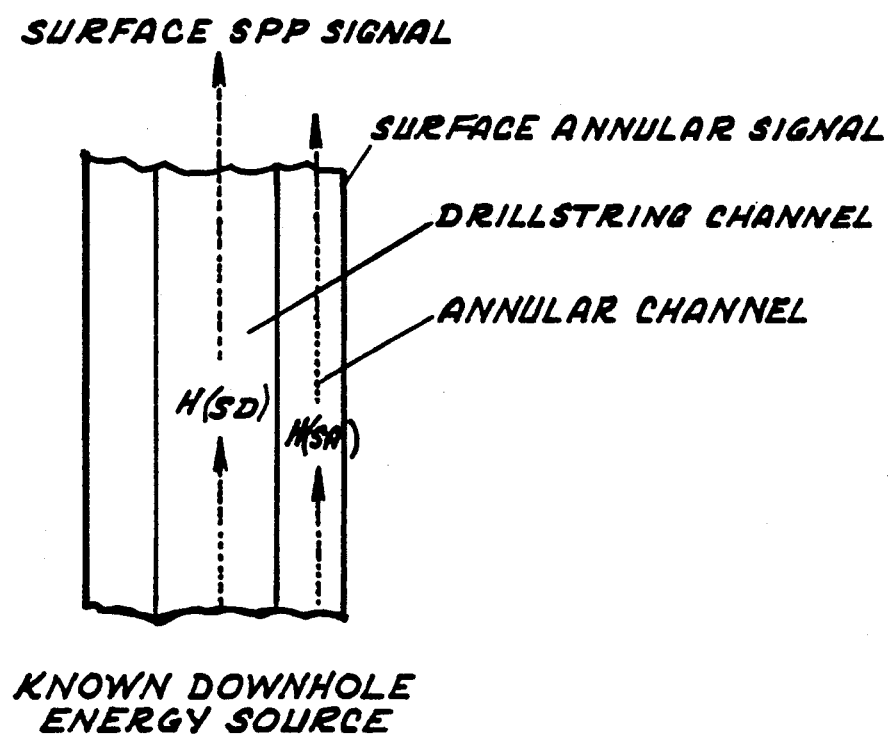
FIG. 1 depicts a diagrammatic cross-sectional view of a drillstring showing both the drillstring channel and annular channel.

Referring now to FIG. 1, a diagrammatic view of a borehole 10 is shown. Positioned within borehole 10 is a drillstring 12. During normal drilling operations, drilling fluid (i.e. mud) circulates down the interior 14 of drillstring 12 through the bottom hole assembly (not shown) and up through the annulus 16 defined by the space between drillstring 12 and borehole 10. Using known measurement-while-drilling techniques, MWD pressure pulses are formed in the bottom hole assembly by any known pressure pulse transmitter such as described in U.S. Pat. No. 3,958,217, which is assigned to the assignee and incorporated herein by reference. These pressure pulses travel through the drilling fluid in both the drillstring interior 14 and annulus 16. Thus, mud column 14 and mud column 16 define, respectively, a drillstring channel and an annular channel for the passage of a standpipe pulse (SPP) signal and an annulus return pulse signal (ARP). The drillstring channel transfer function is hereinafter defined as $H_{SD}$ and the annular channel transfer function is hereinafter defined as $H_{SA}$.

When a downhole energy source induces energy into the mud column, such as the MWD pressure pulses identified by the arrows 18 and 20, the energy source travels to the surface through the drillstring channel 14 and the annular channel 16, and becomes distorted. In accordance with the present invention, the signal received at the surface (which includes the channel distortion) is compared with the transmitted message which will be of known shape. As a result, the phase and amplitide characteristics or transfer function (output signal/input signal) of the channels $H_{SD}$ and/or $H_{SA}$ can be determined. This is accomplished by taking the Discrete Fourier Transform of the the known transmitted signal and the received signal, finding the auto and cross power spectral densities and solving for the transfer function $H_{(S)}$. This procedure is a direct method of determining the frequency characteristics of the annulus and is more sensitive to change than a time domain analysis and more accurate than indirect frequency means such as computing the ratio of the Fourier transform (power spectrum) of the standpipe pressure signal (SPP) divided by the Fourier transform (power spectrum) of the annulus return signal.

Because the presence of intruding fluid into the annulus fluid will generally change the phase and amplitude characteristics of the annulus transfer function, this change can be used as an indicator of fluid influx into the annulus. Because the presence of gas in the annulus fluid will greatly change the phase and amplitude characteristics of the annulus transfer function, this change is particularly useful as an indicator of gas influx into the annulus. This change in the annulus transfer function can be determined by (1) comparing the annulus transfer function to the transfer function in the drillstring channel; or by (2) comparing the annulus transfer function to itself over a pre-selected time history to determine changes in said annulus transfer function; or (3), comparing the annulus transfer function to a reference transfer function. This reference can be a calculated (derived) function or one based on experience (knowledge based). The preferred method for making the comparison is by plotting the transfer function on timed intervals in a common "3 dimensional" or waterfall plot.

To determine the precise shape and timing of the undistorted transmitted message, the message must be received and processed at the surface. Preferably, a surface decoder is utilized to decode the standpipe signal and/or the annulus signal message. Such a decoder typically consists of a signal amplifier, an analogue to digital converter, a digital filter and a zero crossing detection algorithm for determining ones and zeros (such as described in *Modern Instrumentation Tape Recording: An Engineering Handbook*, EMI Technology, Inc., p. 65 (1978) (Library of Congress Catalog Card No. 78-60084)). These devices are all common to the communications industry for decoding signals. The system is employed to decode the standpipe signal and/or the annulus signal message.

Figure 2:
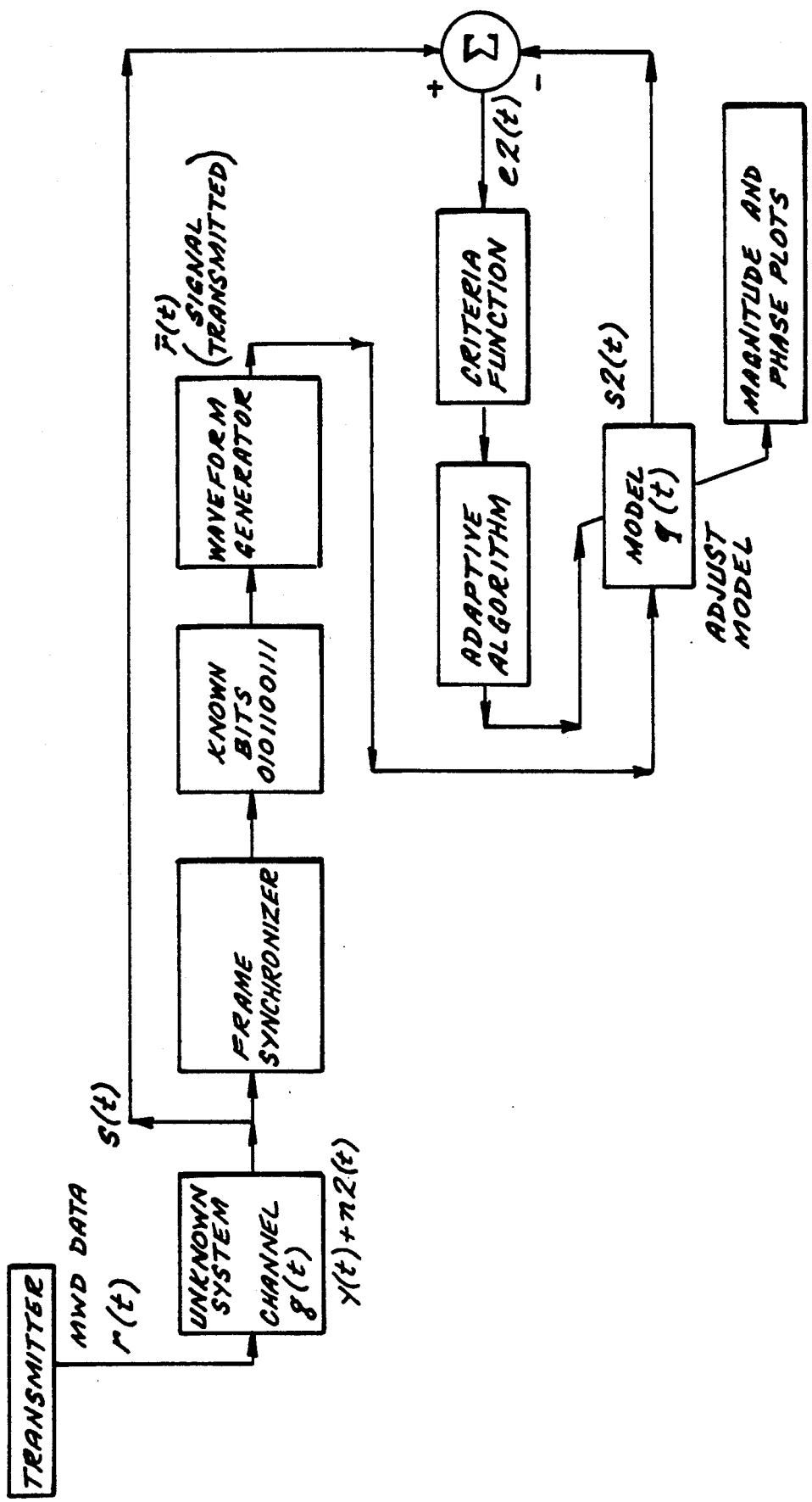
FIG. 2 illustrates the preferred method of determining the annulus transfer function when transmitting a known message.

With reference now to FIG. 2, in one embodiment of the present invention, a message of known content can be transmitted from the bottom hole transmitter so that an accurate analysis may be made between the signal received at the surface and the transmitted signal so as to determine the transfer function. To effect this embodiment, a frame synchronizer is employed to align the message with the known stored message. Frame synchronization is known in the art and is described, for example, on page 449 of *Digital Communication by Satellite* by J. J. Spilker, Jr., Prentice-Hall (1977).

Figure 3:
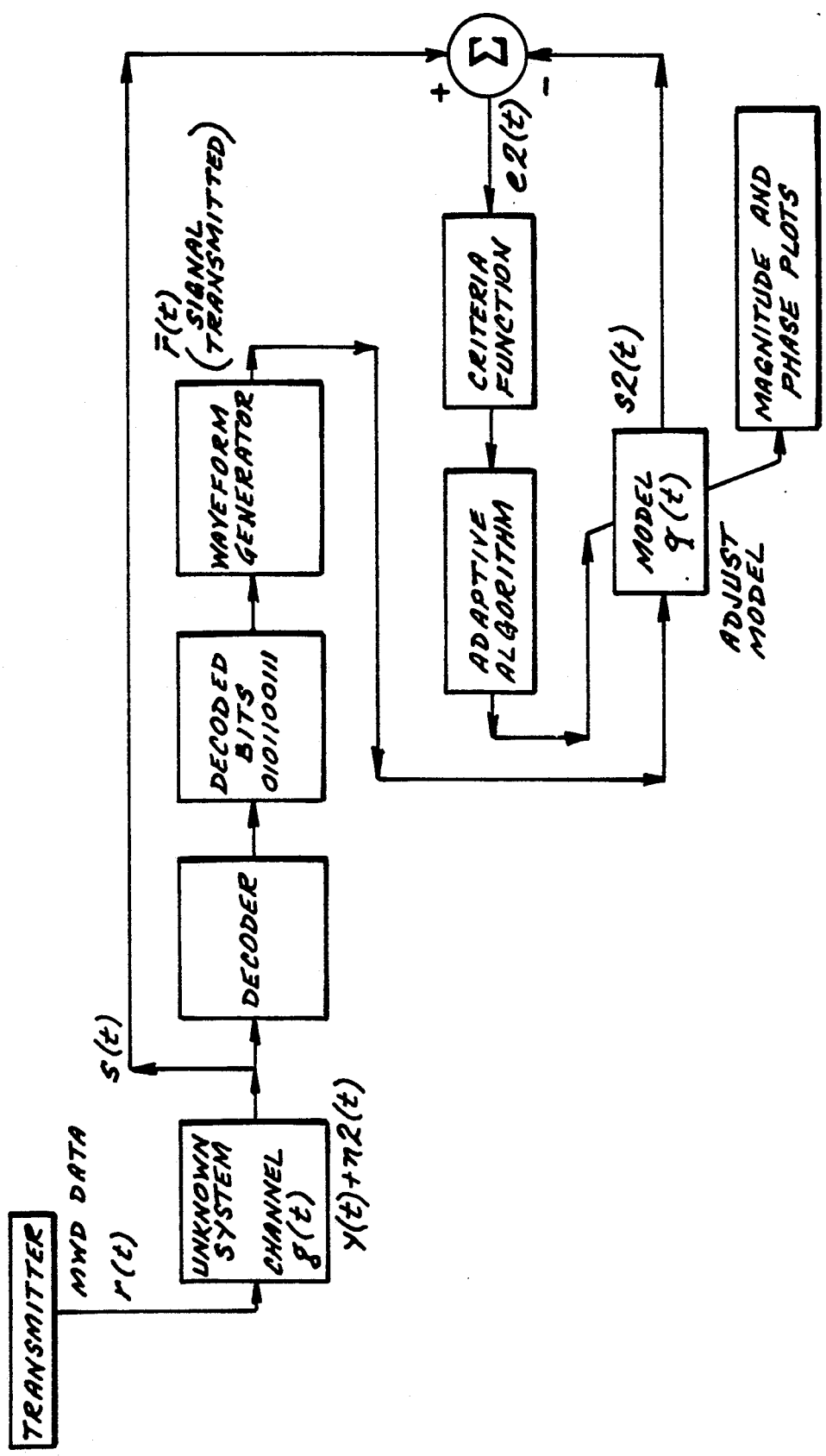
FIG. 3 illustrates the preferred method of determining the annulus transfer function when transmitting an MWD message that requires decoding at the surface.

In an alternative embodiment of the present invention, the signal received at the surface can be decoded and analyzed to determine the annulus transfer function. The FIG. 3 embodiment utilizes a method for determining the annulus transfer function which is described in detail in co-pending U.S. patent application Ser. Np. 579,706 filed Sep. 10, 1990 (now U.S. Pat. No. 5,055,837) entitled "Analysis and Identification of a Drilling Fluid Column Based on Decoding of Measurement-While-Drilling Signals" and invented by Ali Abdallah and Donald Grosso. This co-pending application is fully incorporated herein and provides a detailed description for a method of determining the annulus transfer function based entirely on information derived by the decoded annulus signal.

In certain situations, the annular signal may be so corrupt as to be of little use in reconstructing the transmitted input signal using the above-discussed method of U.S. Ser. No. 579,706. In such a case, the input signal can instead be reconstructed based on analysis of the output signal 18 received from the drillstring channel 14. Again, this analysis would utilize the method described in U.S. Pat. No. 5,055,937.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of detecting fluid influx in an annulus defined between a drill string and a borehole, the drill string and borehole having drilling fluid therein, comprising the steps of:

transmitting an input signal through the annulus from a downhole location to define a transmitted signal;

detecting the transmitted signal uphole of the downhole location to determine an annulus output signal;

determining the transfer function over a range of frequencies in a frequency domain of the annulus based on the input and output signals;

monitoring said transfer function for detecting changes in said transfer function with respect to time so as to determine fluid influx in the annulus.

2. The method of claim 1 wherein:

said input signal is transmitted as a known pre-determined input signal.

3. The method of claim 1 including the step of:
reconstructing the input signal transmitted from downhole based on analysis of the annulus output signal.

4. The method of claim 1 wherein said drill string has an interior having drilling fluid therein and wherein said input signal is also transmitted through the interior of the drill string and including:
detecting the transmitted signal transmitted through the interior of the drill string uphole of the downhole location to determine a drill string output signal; and
reconstructing the input signal transmitted from the downhole location based on analysis of the drill string output signal.

5. The method of claim 1 including:
monitoring said transfer function to determine changes in phase and amplitude.

6. The method of claim 1 including:
monitoring the annulus transfer function with respect to time and determining fluid influx in the annulus by changes in said annulus transfer function.

7. The method of claim 1 including:
monitoring the annulus transfer function with respect to time as compared to a reference transfer function and determining fluid influx in the annulus by changes in said annulus transfer function.

8. The method of claim 1 wherein said step of determining the transfer function comprises the steps of:
taking the Discrete Fourier Transform of the transmitted signal and the annulus output signal; and
determining the auto and cross power spectral densities of the transmitted signal and the annulus output signal.

9. The method of claim 1 wherein:
said transmitted signal is detected near the surface.

10. The method of claim 1 wherein:
said transmitted signal is detected at the surface.

11. The method of claim 1 including:
monitoring said transfer function to determine changes in phase.

12. The method of claim 4 wherein:
the signal transmitted through the interior of the drill string is detected at the surface.

13. The method of claim 4 wherein:
the signal transmitted through the interior of the drill string is detected near the surface.

14. The method of claim 1 including:
monitoring said transfer function to determine changes in amplitude.

* * * * *